United States Patent [19]

Baran et al.

[11] Patent Number: 4,599,745

[45] Date of Patent: Jul. 8, 1986

[54] HYBRID FIBER OPTICS AND RADIO FREQUENCY TELEMETRY APPARATUS FOR ACQUIRING DATA FROM AN UNDERWATER ENVIRONMENT

[75] Inventors: Robert H. Baran, Bethesda; Armand Cioccio, deceased, late of Silver Spring, both of Md., by Mary Jane Cioccio, personal representative; Joseph G. Komenda, Detroit, Mich.; Ronald B. Hawkins, San Diego, Calif.

[73] Assignee: The United States of America as represented by the Secretary of the Navy, Washington, D.C.

[21] Appl. No.: 612,484

[22] Filed: May 21, 1984

[51] Int. Cl.$^4$ .............................................. H04B 9/00
[52] U.S. Cl. ................................ 455/612; 340/870.13; 367/4
[58] Field of Search ............... 455/601, 610, 612, 617, 455/600, 608; 367/3, 4, 5, 6, 132; 340/850, 851, 852, 879.13

[56] References Cited

U.S. PATENT DOCUMENTS

| | | | |
|---|---|---|---|
| 3,665,439 | 5/1972 | Brummer et al. | 340/870.13 |
| 3,903,497 | 9/1975 | Stimler et al. | 455/612 |
| 4,259,746 | 3/1981 | Sandstedt | 455/600 |
| 4,313,226 | 1/1982 | Blackington | 455/603 |
| 4,323,988 | 4/1982 | Will et al. | 367/4 |

OTHER PUBLICATIONS

Petersohn et al.–Dopy–A Minimum Motions Drifting Data Buoy-Conf. Oceans '79, San Diego, Calif., Sep. 17-19 1979, pp. 245-249.
Connors–"Protect Data Acquisition"–Electronics, Apr. 24, 1980, vol. 53, No. 10, pp. 134-141.
Nelson et al.–"An Aircraft Deployed Buoy"–Conf. Oceans '79–San Diego, Calif., Sep. 17-19, 1979, pp. 196-199.

Primary Examiner—Joseph A. Orsino, Jr.
Attorney, Agent, or Firm—Robert F. Beers; Kenneth E. Walden; John G. Wynn

[57] ABSTRACT

An apparatus having both an optical communications link and a radio frequency communications link is configured for oceanologic use so as to acquire engineering data in-water and to telemeter it to an associated shore station. The apparatus comprises, inter alia, an in-water station, a buoy station and the above mentioned shore station. The in-water station includes a plurality of sensors, a data acquisition sub-system, and a fiber optics transmitter for linking the in-water station to the buoy station. The surface buoy station includes a fiber optics receiver, an interface unit, and a very high frequency (VHF) transmitter for telemetering the acquired engineering data, as stated previously, to the shore station. The shore station includes a VHF receiver, a data processor, and a data recorder for recording and storing processed data from the aforementioned data processor for subsequent reduction and analysis.

4 Claims, 4 Drawing Figures

HYBRID FIBER OPTICS AND RADIO FREQUENCY TELEMETRY APPARATUS FOR ACQUIRING DATA FROM AN UNDERWATER ENVIRONMENT

BACKGROUND OF THE INVENTION

1. Field of the Invention

The present invention relates to data acquisition and telemetry communication systems, but more particularly the present invention relates to an apparatus for acquiring data from underwater sites using both an optical communications link and a radio frequency communications link.

2. Description of the Prior Art

In the development of underwater ordnance, for example, and for diverse other purposes such as pollution monitoring, there is a common requirement to acquire data from underwater sensors. In the past, in order to carryout the necessary experiments for development and to acquire the data pertaining thereto, the underwater sensors plus associated equipment such as sensor platforms, hydrophone arrays, and cable connection boxes were planted at various depths on the ocean floor in suitable test areas. Thus, over the years, the ocean floor, in the aforementioned test areas, has become crisscrossed and crowded with electrical cables that have to supply power from a shore installation to the aforementioned underwater sensors and associated equipment, and acquire data from the underwater sensors and deliver this data to the shore installation for subsequent reduction and analysis. These cables, in the particular test site of interest, if laid end-to-end, would extend over 500 kilometers. Consequently, there is a need in the prior art to obviate the requirement for the kind of protracted cable-laying operations that are involved in planting shore-powered underwater sensors and associated equipment that receive power and send data through parallel multiconductor and multiplexed coaxial links.

As further background material, U.S. Pat. No. 4,259,746, filed Oct. 26, 1979, to Sandstedt, entitled, "Electrical Communications System", discloses an apparatus for communicating electrical signals (digital and/or analog) from one location to another first over an RF communications link and then over an optical communications link. The apparatus is configured so that data can be conveyed from a local source of diverse signals to a remote data terminal having a memory for storing the data which upon demand can output the data to one or more selected diverse utilization devices.

The prior art, as indicated hereinabove, include advances in data acquisition systems, including the use of the combination of RF and optical communications links. However, insofar as can be determined, no prior art data acquisition system having fiber optic and radio hybrid telemetry is configured to acquire data from underwater sites on a recurrent basis like the present invention. In addition, as far as is known, no prior art data acquisition system configured for in-water use incorporates all of the features and advantages of the present invention.

OBJECTS OF THE INVENTION

Accordingly, an important object of the present invention is to configure an improved communications system including an in-water station for in-water acquisition of engineering data and the subsequent wireless telemetering thereof from an above-water station (buoy station) to a shore station.

A corollary object of the preceding object is to configure a hybrid telemetry system including an optical link and a radio frequency link so as to eliminate the effect of predetermined electromagnetic noise sources, thereby improving the data acquistion process.

Another object of the present invention is to configure the improved communications system to include a sensor array portion of the in-water station arranged for implantation in a shallow water ocean environment and for recording data therefrom in an improved manner.

Yet another object of the present invention is to eliminate the use of long wires in the vicinity of the in-water station thereby improving overall system performance and the particular performance of the sensor array.

A corollary of the previously stated object is to eliminate the necessity of a shore umblical cord to provide power and signal connections to the in-water station.

A further object of the present invention is to configure the in-water station and the above water station to be self-contained, and, accordingly, consume a minimum of power so that operation for long periods of time can be realized.

SUMMARY OF THE INVENTION

In accordance with the above stated objects, other objects, features and advantages, the present invention has as a primary purpose to implant a sensor array in a shallow water (less than 61 meters) ocean environment and to record data from the sensor array. The foregoing is accomplished while eliminating the use of long multi-wire cables in the vicinity of the aforementioned sensor array.

The essence of the present invention is in the use of, inter alia, an optical communications link and a radio frequency communications link configured particularly for oceanologic use so as to acquire engineering data in-water and to telemeter it to an associated shore station in a unique fashion.

The purpose of the invention is carried out by configuring the apparatus, according to the present invention, to include an in-water station, a buoy station and the aforementioned shore station. The in-water station houses the aforementioned sensor array, a data acquisition sub-system and a fiber optics link to the buoy station. The buoy station contains the receiving end of the fiber optics link and an interface unit for conveying the engineering data acquired (now in digital form) to a very high frequency (VHF) radio transmitter. The shore station contains a VHF receiver, a data processor and a data recorder. The data processor and the data recorder cooperate to cause rapid reduction and analysis of the engineering data.

BRIEF DESCRIPTION OF THE DRAWINGS

The previously stated objects, other objects, features and advantages of the present invention will be apparent from the following more particular description of a preferred embodiment as illustrated in the accompanying drawings, in which.

DESCRIPTION OF THE PREFERRED EMBODIMENTS

The following is a description of two embodiments of a hybrid fiber optics and radio frequency (RF) telemetry apparatus in which the present invention is employed to acquire data from underwater sites. One embodiment is disclosed in FIGS. 1, 2 and 3, while the other embodiment is disclosed in FIG. 4. The operation(s) of the foregoing embodiments are further described and explained hereinafter under the heading "Statement of the Operation."

Figure 1:
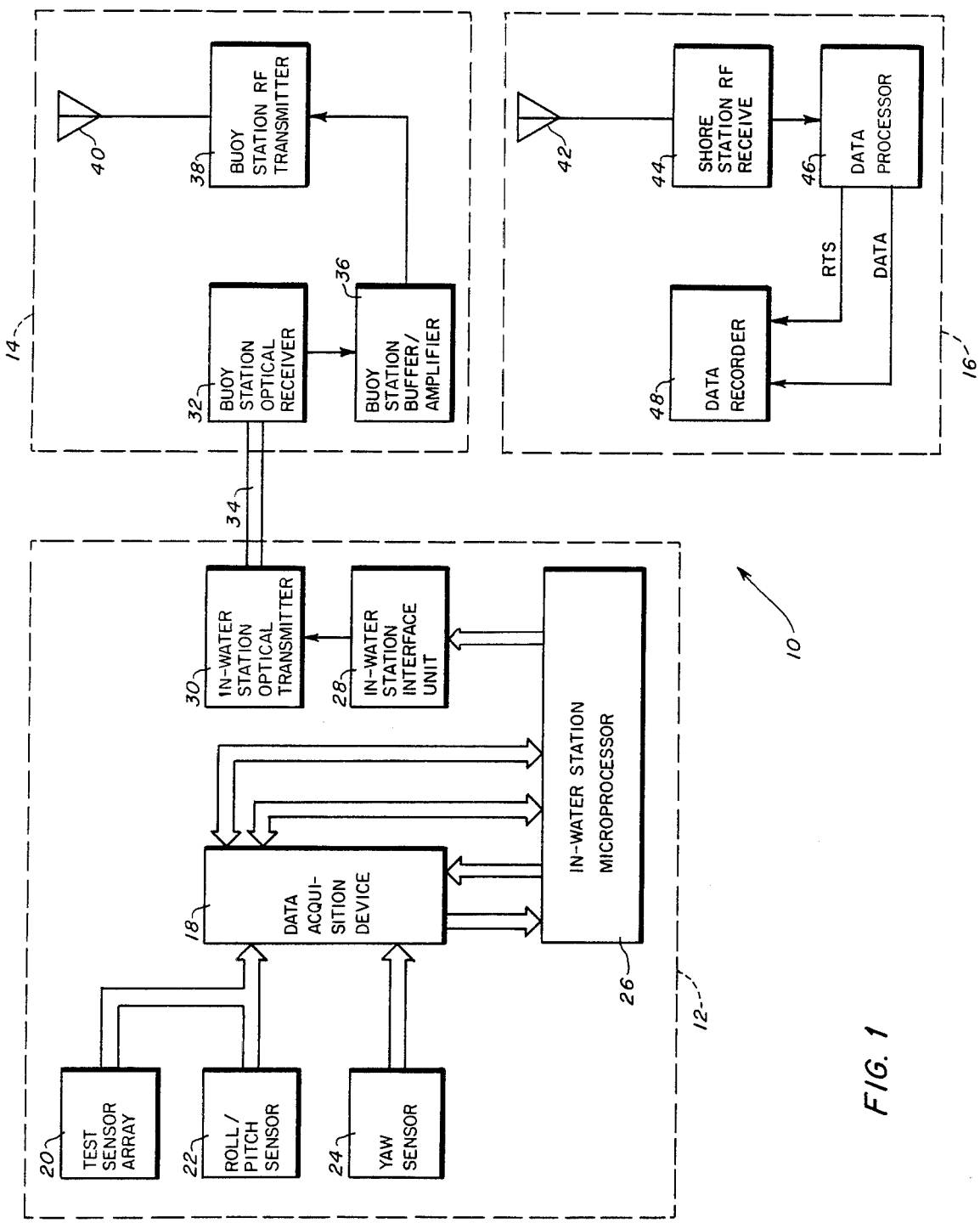
FIG. 1 is a block diagram representation of a hybrid fiber optics and radio frequency telemetry apparatus according to the present invention depicting, inter alia, an in-water station, a surface buoy station and an associated shore station.

Referring then to FIG. 1, a hybrid fiber optics and RF telemetry apparatus 10 is contained whithin three locations in an in-water station 12, a buoy station 14 and a shore station 16. The in-water station 12 houses a data acquisition device 18, a test sensor array 20, a roll/pitch sensor 22, a yaw sensor 24, an in-water station microprocessor 26, an in-water station interface unit 28 and an in-water station optical transmitter 30. As shown, the test sensor array 20 and roll/pitch sensor 22 are operatively connected to the data acquisition device 18. These sensors output analog data. However, the yaw sensor 24, which is also operatively connected to the data acquisition device 18, outputs data already in a digital format. The in-water station microprocessor 26 being operatively connected to the data acquisition device 18 controls the data acquisition process by causing each of the aforementioned sensors 20, 22 and 24 to be sequentially sampled, and by causing the outputs of sensors 20 and 22 to be digitized. The in-water station microprocessor 26 is also operatively connected to the in-water station interface unit 28. Thus, after a predetermined time period, the parallel data bytes out of the in-water station microprocessor 26 is converted by the in-water station interface unit 28 into a serial data stream. The output, i.e., the serial data stream, of the in-water station interface unit 82 is operatively connected to the in-water station optical transmitter 30 and is used to modulate it to produce representatively light pulses. These light pulses are propagated via a fiber optics cable to the buoy station 14.

Still referring to FIG. 1, the buoy station 14 houses a buoy station optical receiver 32, a buoy station buffer/amplifier 36, a buoy station RF transmitter 38 and a buoy station antenna 40. As shown, the buoy station optical receiver 32 is connected at its input to the fiber optics cable 34. This comprises the receiving end of a fiber optics communications link which is compatible to the sending end comprising the in-water station optical transmitter 30, aforementioned. The serial data output of the buoy station optical receiver 32, after being demodulated therein, is connected to the input of the buoy station buffer/amplifier 36 where the data is conditioned and amplified and then applied to the input of the buoy station RF transmitter 38 to perform direct frequency modulation (FM) thereof. The output of the buoy station RF transmitter 38 drives the buoy station antenna 40 which radiates the very high frequnecy (VHF) FM data to the shore station 16.

The shore station 16 houses a shore station antenna 42, a shore station RF receiver 44, a data processor 46 and a data recorder 48. As shown, the shore station antenna 42 is connected to the input of the shore station RF receiver 44. This comprises the receiving end of a radio frequency communications link which is compatible to the sending end comprising the buoy station RF transmitter 38 and the buoy station antenna 40, aforementioned. After demodulation in the shore station RF receiver 44, the serial data drives the data processor 46 which processes the serial data in the form of digital intelligence to reproduce the original data. The data processor 46 is operatively connected to the data recorder 48 which stores the data for subsequent reduction and analysis.

Figure 2:
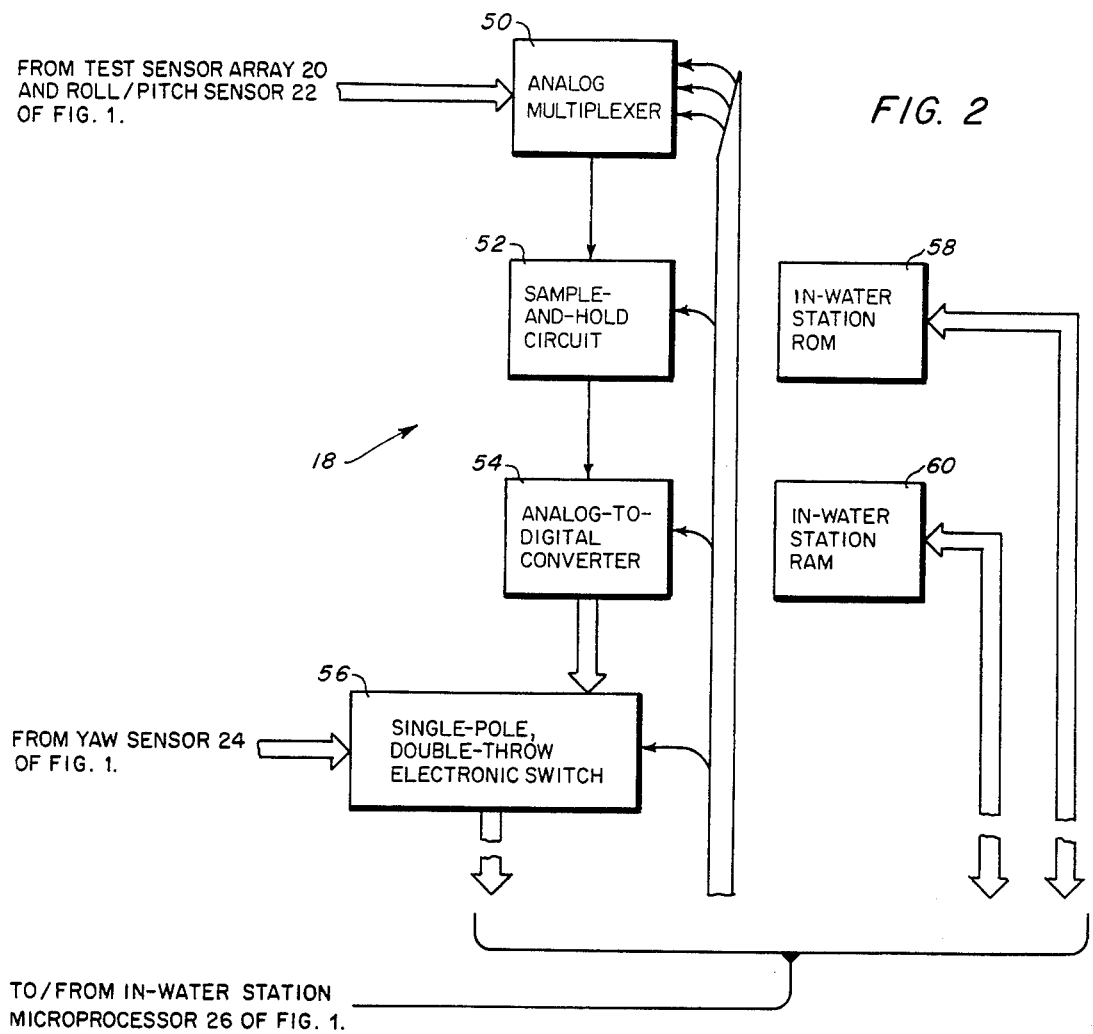
FIG. 2 is a schematic and block diagram representation of the in-water station and the surface buoy station of FIG. 1 depicting, inter alia, the devices and illustrating the technique used to allow the foregoing stations to be dormat for intervals between periodic or intermittant operation so as to extend the service life thereof.

FIG. 2 discloses, in more detail, the data acquisition device 18 of FIG. 1, which comprises an analog multiplexer 50, a sample-and-hold circuit 52, an analog-to-digital converter 54, a single-pole, double-throw electronic switch 56, an in-water station read-only memory (ROM) 58 and an in-water station random access memory (RAM) 60. As shown, the analog output from test sensor array 20 and roll/pitch sensor 22 drive the analog multiplexer 50 which is controlled by control lines from the in-water station microprocessor 26. The output of the analog multiplexer 50 drives the sample-and-hold circuit 52 whose output, in turn, is operatively connected to the analog-to-digital converter 54. The digital information out of the analog-to-digital converter 54 is connected to the signal-pole, double-throw electronic switch 56. The output of the yaw sensor 24 of FIG. 1 which is already in a digital format is also connected to the single-pole, double-throw electronic switch 56. In addition, control lines from the in-water station microprocessor 26 are connected to the sample-and-hold circuit 52, the analog-to-digital converter 54, and the single-pole, double-throw electronic switch 56 whose output is operatively connected to the in-water station microprocessor 26, aforementioned. The in-water station ROM and RAM 58 and 60, respectively, are also operatively connected to the in-water station microprocessor 26. More about the coaction and operation of the foregoing elements of the data acquisition device 18 will be explained hereinafter under the heading "Statement of the Operation."

Figure 3:
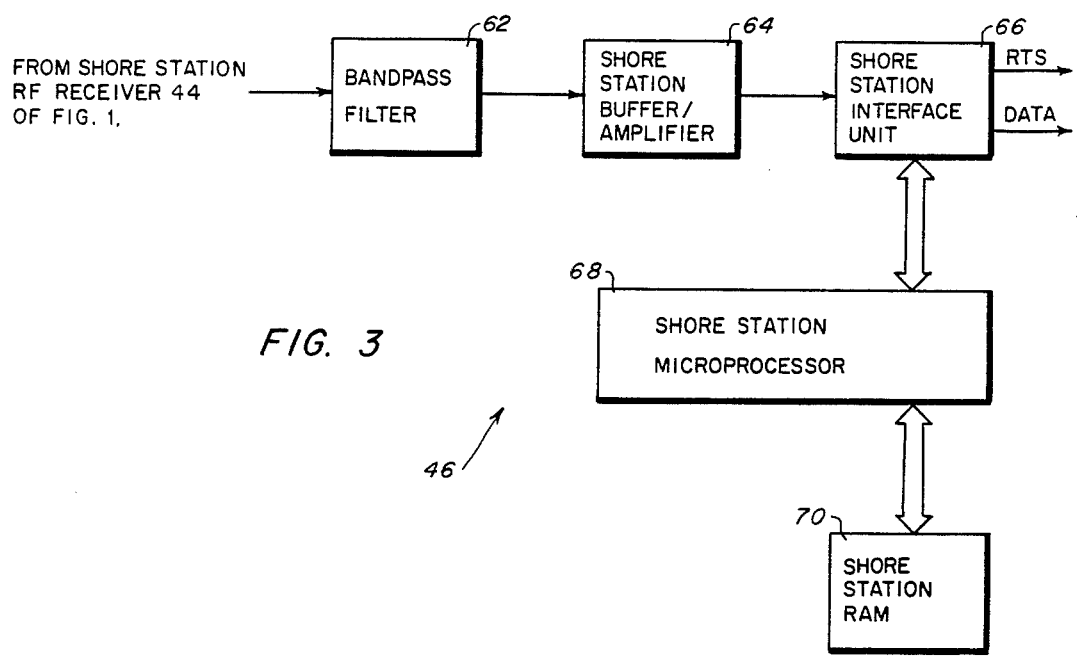
FIG. 3 is a more detailed block diagram representation of the data acquisition sub-system of FIGS. 1 and 2.

FIG. 3 discloses, in more detail, the data processor 46 of FIG. 1, which comprises a bandpass filter 62, a shore station buffer/amplifier 64, a shore station interface unit 66, a shore station microprocessor 68 and a shore station RAM 70. As shown, the shore station RF receiver 44 of FIG. 1 is connected to the input of the bandpass filter 62 whose output is operatively connected to the shore station interface unit 66. The output(s) of the shore station interface unit 66 is operatively connected to the data recorder 48 of FIG. 1. The shore station microprocessor 68 is operatively connected between the aforementioned shore station interface unit 66 and the shore station RAM 70. The shore station microprocessor 68 acts as a control device for controlling data flow to and from the shore station RAM 70 and to and from the shore station interface unit 66 and for operating the data recorder 48. More about the coaction and operation of the foregoing elements of the data processor 46 will be explained under the heading "Statement of the Operation" hereintofollow.

STATEMENT OF THE OPERATION

Figure 4:
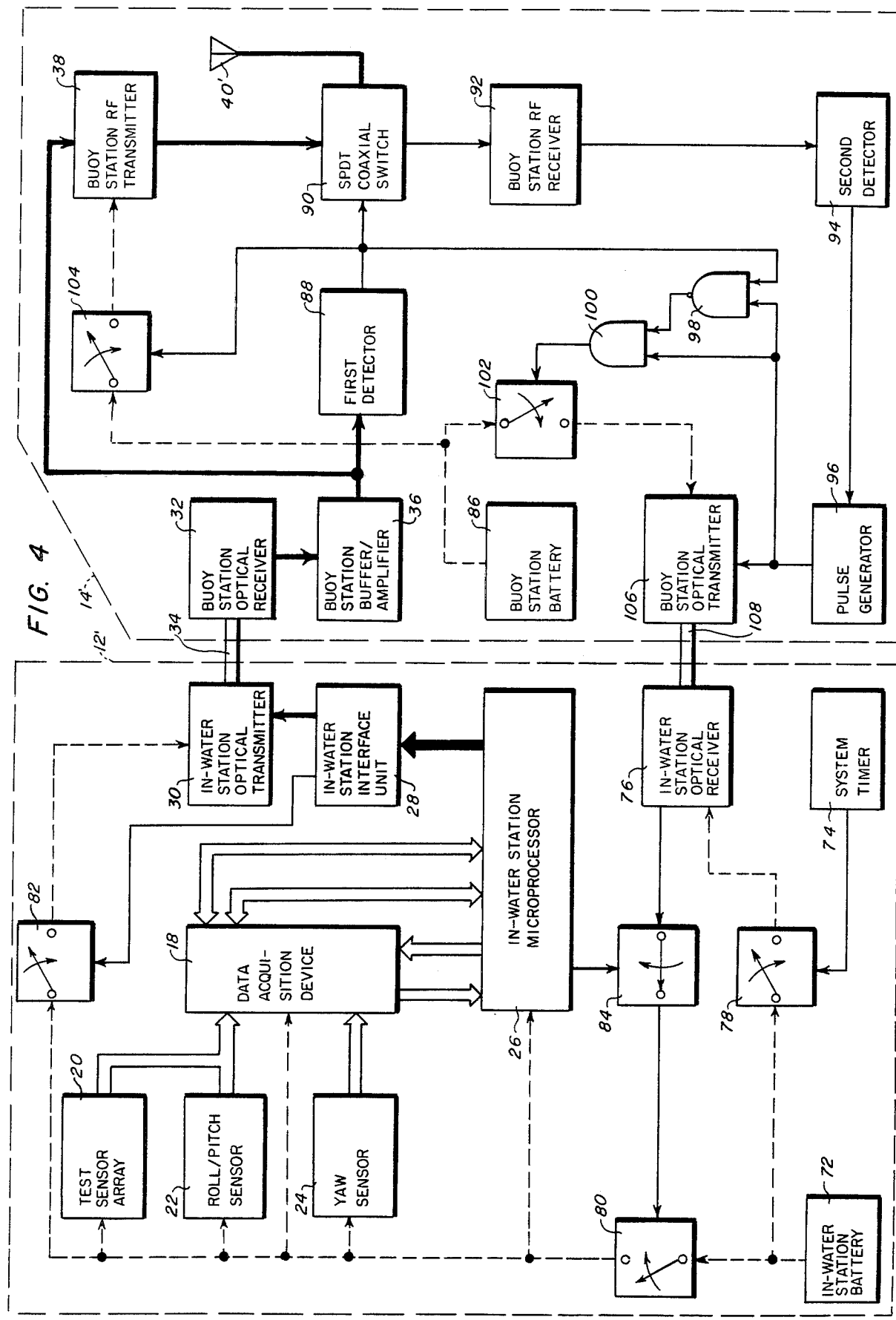
FIG. 4 is a more detailed block diagram representation of the shore station of FIG. 1 depicting, inter alia, how engineering data from the sensor array of FIG. 3 is reduced and analysed according to the present invention.

Details of the operation(s), according to the preferred embodiments of the present invention, are explained first in conjunction with the embodiment of FIGS. 1, 2 and 3 and then in conjunction with the embodiment of FIG. 4.

Referring then to FIGS. 1, 2 and 3 as viewed concurrently, the test sensor array 20 and the roll/pitch sensor 22 of the in-water station 12 products analog voltages which are applied to the parallel inputs of the analog multiplexer 50 of the data acquisition device 18. A 3-bit select code, generated by the in-water microprocessor 26, transfers the desired voltage to the sample-and-hold circuit 52. The sampled value of the desired voltage is digitized by the analog-to-digital converter 54, which produces a 12-bit two's complement digital code. The yaw sensor 24 is a digital data source, which also produces 12-bit values. These two 12-bit values are gated alternately to parallel input ports of the in-water microprocessor 26 by the single-pole, double-throw electronic switch 56. Selection is controlled by a single line from the aforementioned in-water station microprocessor 26. For purposes of the present invention, the yaw sensor 24 can be a digital compass similar to the one disclosed in U.S. Pat. No. 4,412,387, filed May 10, 1982, to Lenko, entitled, "Digital Compass Having a Ratiometric Beaing Processor", and assigned to the same assignee as the present invention.

It should be understood that specifications such as sampling rates, the specific code techniques, etc. are disclosed for purposes of explanation as to a preferred embodiment of the present invention. With the foregoing in mind, assume that the test sensor array 20 comprise two band limited sensors. Accordingly, one technique would be to sample each at 60 Hz through windows of approximately one minute duration giving a combined sampling rate of 120 Hz. The other sensors, roll/pitch sensor 22 and yaw sensor 24, provide information on the status of the in-water station 12 and can be reviewed less frequently. The sampling procedure can be written symbolically as follows:

$$\{[(a_1 \; a_2)^{n_2} \; d]^{n_1} \; a_3 \; a_4\}^{n_0},$$

where $a_1$ represents the analog response of one of the sensors of the test sensor array 20 and $a_2$; $a_2$ and $a_3$ represent the analog responses, i.e., roll and pitch, of the roll/pitch sensor 22; d represents the digital response of the yaw sensor 24; and $n_2$, $n_1$, and $n_0$ represents in respective particular fashions the number of successive samples. Thus, the above expression can be interpreted to mean that $a_1$ and $a_2$ are sampled in alternation $n_2$ times in succession and then d is sampled once. This process is repeated $n_1$ times before $a_3$ and $a_4$, in that order, are sampled thereby completing a fundamental cycle. This fundamental cycle is repeated $n_0$ times without interruption. The number of samples N in the whole window is as follows:

$$N = n_0[2 + n_1 (1 + 2n_2)].$$

For $n_0 = 13$, $n_1 = 5$, and $n_2 = 60$, N is equal to 7,891 samples which corresponds to N/120 Hz = 66 seconds per window.

To continue, the in-water station ROM 58 contains a program to direct the sampling process so as to control both the sampling rate and sequence. Interim data storage is directed by a subroutine which attaches a 4-bit sensor identifier code to each 12-bit sample value and stores the resulting code word in the in-water station RAM 60. The instruction set of the in-water microprocessor 26 is well suited to the storage of byte pairs (where eight bits comprise a byte). Hence the identifier code occupies the first four bits of the higher order byte and the remaining twelve bits are sampled data. The in-water station microprocessor 26 uses 16 kilobytes of random access storage via the in-water station RAM 60. The 7,891 samples accumulated after 66 seconds of processing fill the in-water station RAM 60 with 15,782 bytes. Data acquisition is interrupted at this point in time as the in-water station microprocessor 26 operates, via the in-water station serial interface unit 28, so as to cause the entire contents of the in-water station RAM 60 to be read out or transferred to the input of the in-water station optical transmitter 30. This process takes about 30 seconds whereupon data acquisition is resumed.

Continuing, the bit stream out of the in-water station interface unit 28 is shifted therein to zero-and-five volt levels, i.e., transistor-transistor logic (TTL) levels, and applied to the TTL compatible in-water station optical transmitter 30. The aforementioned transmitter, in turn, sends an equivalent sequence of 820 nanometer (A) light pulses through the fiber optics cable 34 to the complementary buoy station optical receiver 32 of buoy station 14. The buoy station optical receiver 32, in combination with the buoy station buffer/amplifier 36, reconverts the bit stream of light pulses into TTL electronic levels. This output is coupled to the buoy station RF transmitter 38 where it is used to modulate the carrier thereof. For purposes of the present invention, the carrier frequency of the buoy station RF transmitter 38 is about 176 mHz at 1 watt of RF power. Thus, the signal transmitter via the buoy station antenna 40 is a frequency modulated (FM) telemetry signal.

Still referring to FIGS. 1, 2 and as viewed concurrently, the FM telemetry signal is picked-up on shore by the shore station antenna 42 of the shore station 16. The received signal is connected to the shore station RF receiver 44 which demodulates and passes it to the data processor 46. The bandpass filter 62, the shore station buffer/amplifier 64 and the shore station interface unit 66 of the data processor 46 cooperate to sharpen the transition of the signal, establish a squelch level and bring the signal to TTL levels at outputs of the aforementioned shore station interface unit 66. As shown, the data, in the form of 13-second bursts, can be fed directly to the data recorder 48 if it has formatting capability or in the alternative, heading and trailing labels can be attached to the 13-second data bursts by the shore station interface unit 68. In this alternative situation, the shore station microprocessor 68 serves as a control device to operate the data recorder 48 which for purposes of the present invention can be a digital data recorder. In operation, the shore station interface unit 66 is placed in the receive mode and "waits" for a data transmission from the in-water station 14 to begin. The shore station interface unit 66, which for purposes of the present invention can be of the type that meets the RS-232C standard, receives, and in cooperation with the shore station microprocessor 68, causes to be stored a predetermined amount of data in the shore station RAM 70. For purposes of the present invention, the shore station RAM 70 has a storage capacity of 16 kilobytes. After the data is stored in the shore station RAM 70, the shore station interface unit 66 is placed in the send or transmit mode. At this point in time, a signal on the request to send (RTS) line from the shore station interface unit 66 starts the data recorder 48. The data is transferred from the shore station RAM 70, via the shore station microprocessor 68 and the shore station interface unit 66, to the data recorder 48 on the data line as shown. When the shore station RAM 70 is again empty, the shore station interface unit 66 returns to the receive mode to await another data transmission from the in-water station 12 and the buoy station 14.

The true-worth or value of the hybrid fiber optics and radio frequency telemetry apparatus 10 of FIG. 1, measured in kilobytes or sample points accumulated in its life cycle, is adequate for many applications. However, to realize the full potential of the hybrid technique disclosed herein, a service life extension feature or modification(s) is incorporated into the aforementioned apparatus, which allows it to be dormant for intervals between periodic or intermittant operation. The modified embodiment is shown in FIG. 4.

Referring then to FIG. 4, the buoy station antenna 40' configured for both transmitting and receiving operations is connected to the SPDT coaxial switch 90, which in normal operation, due to the absence of a signal from the first detector 88, feeds the buoy station RF receiver 92. For purposes of clarification, the thick solid lines represent data lines, the thin solid lines represent control lines and the dashed lines represent power lines. To continue, as required by the telemetry operation, the data signal from the buoy station buffer/amplifier 36 conditioned by the first detector 88 places the SPDT coaxial switch in the transmit mode. In actual operation, the buoy station RF receiver 92 is configured to emit a pulse whenever a shore-based transmitter (not shown) signals the modified buoy station 14'. It should be clear that a separate transmitter, like buoy station transmitter 38, can be used for this purpose. In the alternative, a transceiver having both receiving and transmitting capacities can be substituted for the shore station RF receiver 44 of FIG. 1. A predetermined sequence of the aforementioned pulses operates to cause the second detector 94 to trigger the pulse generator 96. The output of the pulse generator 96, i.e., a control signal, divides into two paths. In one path its output drives inputs of NAND gate 98 and AND gate 100. The other input of NAND gate 98 is driven by the output of the first detector 88. As shown, the output of the NAND gate 98 feeds the other input of the AND gate 100, which, in turn, drives the first buoy station electronic switch 102 (normally opened). This action toggles the switch 102 thereby applying power from the buoy station battery 86 to the buoy station optical transmitter 106. In its other path, the pulse generator 96 concurrently applies the control signal to the buoy station optical transmitter which is used to modulate it so as to form a control signal in the form of modulated light information. This control signal is coupled to the in-water station optical receiver 106 via the other fiber optics cable 108. The in-water station battery in conjunction with the system timer 74 and the first in-water station electronic switch 78 (normally closed) activates the in-water station receiver 106. Subsequent control signal action via the second, third and fourth in-water station electronic switches 80 (normally opened), 82 (normally opened) and 84 (normally closed), respectively turns off all of the subsystems in the modified in-water station 12' as can be followed by the dotted power lines, except the system timer 74.

Still referring to FIG. 4, periodic reactivation of the in-water station optical receiver 76, in the modified in-water station 12', is directed by the system timer 74. The same shore-based transmitter (not shown) which directed the turn off operation will operate to activate the modified in-water station 12' when the aforementioned predetermined sequence of pulses coincides with predetermined "perk-up" instructions from the system timer 74. The in-water station microprocessor 26 is programmed to override external commands for several minutes following each activation so that repetition of the signal from the shore-based transmitter does not cause the modified in-water station 12' to flip-flop between the activated state or deactivated state. The data transmission process is the same as previously mentioned in conjunction with the discussion of FIG. 1 except that in FIG. 4, the buoy station RF transmitter 38 is gated (powerwise), via the buoy station battery 86 and the second buoy station electronic switch 104 (normally opened), by the first detector 88 on the output from the buoy station optical receiver 32.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. A hybrid fiber optics and radio frequency telemetry apparatus for acquiring data from an underwater environment comprising:

an in-water station comprising a plurality of sensors, means for sampling the outputs of said plurality of sensors and, means for forming encoded data first in the form of electrical signals and then in the form of light signals for subsequent transmission;

said plurality of sensors comprising a test sensor array operatively disposed in said in-water station and in the underwater environment for generating signals in an analog format indicative of and characterized by the underwater environment, said means for sampling and means for forming encoded data comprising a data acquisition device operatively connected to said test sensor array for sequentially sampling the test data from said test sensor array at predetermined rates for forming encoded words from the sampled values of each of said sensors together with a sensor identifier and furnishing at the output of the data acquistion device parallel processed multiplexed digital data representative of the test data derived from the test sensor array, said data acquisition device of said in-water station comprising:

an analog multiplexer operatively connected to said test sensor array an in-water station microprocessor providing means for furnishing a predetermined select signal to said analog multiplexer so as to interleave the data from each sensor of said test sensor array so that the data from each of said sensors share a common channel in a time division multiplexed fashion at the output of said analog multiplexer, the in-water station microprocessor being operatively connected to said data acquisition device for controlling the sampling of said test sensor array at the predetermined rates so as to control sampling rate and sequence, interim storage and flow rate of the test data and status information according to a predetermined operational program, a sample-and-hold circuit operatively connected to the output of said analog multiplexer and to said in-water station microprocessor, said in-water station microprocessor providing means for furnishing a predetermined sample/hold command signal to said sample-and-hold circuit so that the data from said test sensor array is sampled at the predetermined rates, an analog-to-digital converter operatively connected to the output of said sample-and-hold circuit and to said in-water station microprocessor for digitizing the sampled data at its input so as to furnish, in a parallel format, a 12-bit two's complement digital code at its output, and a single-pole, double-throw electronic switch operatively connected to a sensor and the output of said analog-to-digital converter and to said in-water station microprocessor, said in-water station microprocessor also providing means for furnishing a predetermined select signal to said single-pole, double-throw electronic switch so as gate alternately the signal from the output of said sensor and the signal from the output of said analog-to-digital converter to a parallel input port of said in-water station microprocessor, a fiber optics cable operatively connected between said in-water station and a buoy station for propagating the encoded data in the form of light information from said in-water station to said buoy station thereby forming a fiber optics communication link therebetween; and said in-water station further comprising an in-water station interface unit operatively connected to said in-water station microprocessor for the converting the parallel processed digital data into serial multiplexed digital data, said in-water station further comprising an in-water station optical transmitter operatively connected at its input to the output of said in-water station interface unit and at its output connected to one end of the fiber optics cable providing means for modulating said in-water station optical transmitter with the serial multiplexed digital data so as to furnish the encoded data in the form of light signals and send it through fiber optics cable as a serial time-division multiplexed transmission;

a buoy station comprising a buoy station optical receiver operatively connected to the other end of said fiber optics cable for demodulating the serial time-divison multiplexed transmission at its input back into serial miltiplexed digital data at its output, a buoy station buffer/amplifier operatively connected to the output of said buoy station optical receiver providing means for preventing said buoy station buffer/amplifier from influencing the operation of said buoy station optical receiver and providing means for conditioning and amplifying the serially multiplexed digital data at its input to a predetermined level at its output, a buoy station radio frequency transmitter operatively connected at its input to the output of said buoy station buffer/amplifier, the conditioned and amplified electrical serially processed multiplexed digital data being used to modulate said buoy station transmitter so as to furnish the encoded data in the form of modulated frequency information for subsequent transmission, and a buoy station antenna operatively connected to the output of said buoy station transmitter for radiating the encoded data in the form of radio frequency information to said shore station; and a receiving station comprising: a receiving station antenna for receiving the radiated encoded data in the form of radio frequency information from said buoy station antenna, a receiving station radio frequency receiver operatively connected at its input to said receiving station antenna for demodulating the encoded data in the form of radio frequency information into a facsimile of the serially processed multiplexed digital data at its output, a data processor operatively connected at its input to the output of said receiving station radio frequency receiver for executing a systmatic sequence of operations including data reduction and analysis of the serially processed multiplexed digital data at its input to cause transformation thereof into a more useful form of data, and a data recorder operatively connected to the output of said data processor for recording the more useful form of data for subsequent additional analysis.

2. The hybrid fiber optics and radio frequency telemetry apparatus of claim 1 wherein said data acquisition device further comprises an in-water station read-only memory (ROM) operatively connected to said in-water station microprocessor, said in-water station ROM containing a predetermined program for directing the sampling process so as to control both the sampling rate and sequence of said plurality of sensors.

3. The hybrid fiber optics and radio frequency telemetry apparatus of claim 2 wherein data acquisition device further comprises an in-water station random access memory (RAM) operatively connected to said in-water station microprocessor, said in-water station RAM being configured for interim storage of samples of the encoded data in the form of electrical information.

4. The hybrid fiber optics and radio frequency telemetry apparatus of claim 3 wherein said data processor of said receiving station comprises:

a bandpass filter operatively connected to the output of said receiving station radio frequency receiver said bandpass filter providing means for passing the facsimile of the serially processed multiplexed digital data at its input within a predetermined frequency range and to reject noise without the predetermined frequency range;

a receiving station buffer/amplifier operatively connected to said bandpass filter and said receiving station radio frequency receiver so as to prevent said receiving buffer/amplifier from influencing the operation of said bandpass filter of said receiving station, said receiving station buffer/amplifier providing means for conditioning and amplifying the facsimile of the serially processed multiplexed digital data at ita input to a predetermined level at its output;

a receiving station interface unit operatively connected to said station buffer/amplifier and said data recorder;

a receiving station random access memory (RAM) for interim storage of a predetermined amount of the more useful form of data for subsequent use; and a receiving station microprocessor operatively connected between said shore station interface unit and said shore station RAM for controlling the storage of the predetermined amount of more useful form of data therein and for transferring it therefrom via said receiving station interface unit to said data recorder.

* * * * *